United States Patent [19]
Lew et al.

[11] Patent Number: 5,598,103
[45] Date of Patent: Jan. 28, 1997

[54] INTERFACE DISTANCE SENSOR AND ITS APPLICATION TO PRESSURE SENSING

[76] Inventors: Hyok S. Lew; Yon S. Lew, both of 7890 Oak St., Arvada, Colo. 80005

[21] Appl. No.: 358,723

[22] Filed: Dec. 19, 1994

Related U.S. Application Data

[63] Continuation-in-part of Ser. No. 133,349, Oct. 8, 1993, Pat. No. 5,499,544.

[51] Int. Cl.$^6$ ...................................................... G01B 7/15
[52] U.S. Cl. ........................ 324/662; 73/718; 73/861.47; 340/870.37
[58] Field of Search ................................. 73/861.56, 718, 73/304 C, 861.47; 340/870.37; 324/661, 662, 671

[56] References Cited

U.S. PATENT DOCUMENTS

| | | | |
|---|---|---|---|
| 4,398,194 | 8/1983 | Johnston | 324/661 |
| 4,841,224 | 6/1989 | Chalupnik et al. | 324/661 |
| 5,136,250 | 8/1992 | Abdelli | 324/661 |

Primary Examiner—Richard Chilcot
Assistant Examiner—Harshad Patel

[57] ABSTRACT

An apparatus for measuring distance between two interfaces comprises a first electrically conductive planar member defining the first of the two interfaces, a second electrically conductive planar member defining the second of the two interfaces, an alternating electrical signal generator supplying an input alternating electrical signal to the first electrically conductive planar member through a first electrical conductor having a high value of ohmic resistance, and a phase difference measuring device measuring a phase angle difference between a first output alternating electrical signal taken off from one extremity of the second electrically conductive planar member through a second electrical conductor having a high value of ohmic resistance and a second output alternating electrical signal taken off from the other extremity of the second electrically conductive planar member or from the alternating electrical signal generator; wherein the distance between the two interfaces is determined as a function of the phase angle difference between the first and second output alternating electrical signals.

20 Claims, 6 Drawing Sheets

INTERFACE DISTANCE SENSOR AND ITS APPLICATION TO PRESSURE SENSING

This patent application is a Continuation-In-Part to patent application 08/133,349 entitled "Capacitively Coupled Ohmic Resistance Position Sensor" filed on Oct. 8, 1993, that is now U.S. Pat. No. 5,499,544.

FIELD OF INVENTION

This invention relates to an apparatus determining distance between two planes as a function of a phase angle difference between two alternating electrical signals respectively taken off from the two opposite extremities of one of a pair of electrically conductive planar members disposed on the first of the two planes, wherein the second of the two planes is defined by a third electrically conductive planar member; and its application to pressure sensing wherein the pressure between two thin planar members is determined as a function of the interface distance between the two thin planar members.

BACKGROUND OF INVENTION

The existing versions of pressure sensors measuring differential pressure across a thin metallic diaphragm determines the differential pressure as a function of change in the electrical capacitance between the thin metallic diaphragm and a reference plane defined by a metallic planar member disposed parallel and closely adjacent to the thin metallic diaphragm, which electrical capacitance changes due to the lateral deflection of the thin metallic diaphragm resulting from the differential pressure loading on the thin metallic diaphragm. Such a method for measuring pressure or differential pressure relies on the measurement of the electromotive force drop in an electric circuit comprising the combination of the thin metallic diaphragm and the metallic planar member as a capacitive element included in the electric circuit, or by measuring the natural frequency of the electric circuit including the combination of the thin metallic diaphragm and the metallic planar member as a capacitive element of the circuit, which method relies on the measurement of the amplitude of an electrical signal, that is often subjected to drift due to aging of the electric circuit elements making up the electric circuit providing the electrical signal. As a consequence, the existing method for determining pressure or differential pressure is prone to errors arising from the drift in the characteristics of the electric circuit comprising the combination of the thin metallic diaphragm and the metallic planar member. It is well known fact that the phase angle difference between two alternating electrical signals is independent of drift in the amplitude of the two alternating electrical signals and consequently, determining a physical quantity as a function of the phase angle difference between two alternating electrical signals provides more reliable and accurate results compared with a method relying on the measurement of the amplitude of one of the two alternating signals. The present invention teaches a method for determining separation distance between two planes respectively defined by two thin metallic planar members as a function of phase angle difference between two alternating electrical signals, and its application to the construction of various embodiments of the pressure sensor that determines the pressure or differential pressure by measuring separation distance between a thin metallic diaphragm under the differential pressure loading and a reference metallic planar member.

BRIEF SUMMARY OF INVENTION

The primary object of the present invention is to provide an interface distance sensor measuring distance between a first plane defined by a pair of electrically conductive planar members disposed in a coplanar relationship and a second plane defined by a third electrically conductive planar member; wherein the interface distance between the first and second plane is determined as a function of a phase angle difference between two output alternating electrical signals respectively taken off from two opposite extremities of one of the pair of electrically conductive planar members defining the first plane through two different resistors respectively connected to the two opposite extremities of the first electrically conductive planar member, which two output alternating electrical signals are generated by an input alternating electrical signal supplied to the two opposite extremities of the second of the pair of electrically conductive planar members defining the first plane.

Another object is to provide a pressure sensor comprising a pressure compartment intermediate the first and second plane structure defined in the afore-mentioned primary object of the invention; wherein one of the first and second plane structures is deflective under a pressure loading thereon, and the differential pressure across the deflective planar structure is determined as a function of the phase angle difference between the two alternation electrical signals defined in the afore-mentioned primary object of the invention.

A further object is to provide a pressure sensor comprising a first pressure compartment disposed intermediate the second planar structure defined in the afore-mentioned primary object of the invention and a third plane defined by a fourth electrically conductive planar member, which first pressure compartment straddles the first planar structure defined in the afore-mentioned primary object of the invention that is now disposed intermediate the second and third plane structures, and a second pressure compartment straddling the combination of the first pressure compartment and the first, second and third plane structures; wherein the differential pressure between the first and second pressure compartments is determined as a function of the phase angle difference between the two alternating electrical signals defined in the afore-mentioned primary object of the invention.

Yet another object is to provide an interface distance sensor measuring distance between a first plane defined by a first electrically conductive planar member and a second plane defined by a second electrically conductive planar member; wherein the interface distance between the first and second planes is determined as a function of a phase angle difference between two output alternating electrical signals respectively taken off from two opposite extremities of the first electrically conductive planar member through two different resistors respectively connected to the two opposite extremities of the first electrically conductive planar member, which two output alternating electrical signals are generated by an input alternating electrical signal supplied to the second electrically conductive planar member.

Yet a further object is to provide a pressure sensor comprising a pressure compartment intermediate the first and second plane defined in the afore-mentioned yet another object of the invention; wherein one of the first and second planar members is deflective under a pressure loading thereon, and the differential pressure across the deflective plane is determined as a function of the phase angle difference between the two alternating electrical signals defined in the afore-mentioned yet another object of the invention.

Still another object is to provide a pressure sensor comprising a first pressure compartment disposed intermediate the second plane defined in the afore-mentioned yet another object of the invention and a third plane defined by a third electrically conductive planar member, which first pressure compartment straddles the first plane defined in the afore-mentioned yet another object of the invention that is now disposed intermediate the second and third plane, and a second pressure compartment straddling the combination of the first pressure compartment and the first, second and third planes; wherein the differential pressure between the first and second pressure compartments is determined as a function of the phase angle difference between the two alternating electrical signals defined in the afore-mentioned yet another object of the invention.

Still a further object is to provide an interface distance sensor measuring distance between a first plane defined by a first electrically conductive planar member and a second plane defined by a second electrically conductive planar member; wherein the interface distance is determined as a function of a phase angle difference between two output alternating electrical signals respectively taken off from two opposite extremities of the first electrically conductive planar member through two different resistors respectively connected to the two opposite extremities of the first electrically conductive planar member, which two output alternating electrical signals are generated by an input electrical signal supplied to two opposite extremities of the second electrically conductive planar member through two different resistors respectively connected to the two opposite extremities of the second electrically conductive planar member.

Yet still another object is to provide a pressure sensor comprising a pressure compartment intermediate the first and second planes defined in the afore-mentioned still a further object of the invention; wherein one of the first and second planar members is deflective under a pressure loading thereon, and the differential planar across the deflective pressure member is determined as a function of the phase angle difference between the two alternating electrical signals defined in the afore-mentioned still a further object of the invention.

Yet still a further object is to provide a pressure sensor comprising a first pressure compartment disposed intermediate the second plane defined in the afore-mentioned still a further object of the invention and a third plane defined by a third electrically conductive planar member, which first pressure compartment straddles the first plane defined in the afore-mentioned still a further object of the invention that is now disposed intermediate the second and third plane, and a second pressure compartment straddling the combination of the first pressure compartment and the first, second and third planes; wherein the differential pressure between the first and second pressure compartments is determined as a function of the phase angle difference of the two alternating electrical signals defined in the afore-mentioned still a further object of the invention.

These and other objects of the present inventions will become clear as the description of the inventions progresses.

BRIEF DESCRIPTION OF FIGURES

The present invention may be described with a greater clarity and specificity by referring to the following figures.

DESCRIPTION OF ILLUSTRATED EMBODIMENTS

In the parent application Ser. No. 08/133,349, it has been disclosed that a position sensor comprising a pair of electrically conductive elongated ribbons or strips made of a material having a high ohmic resistance and disposed in a side-by-side coplanar relationship, and an electrically conductive stub planar member disposed parallel and closely adjacent to the pair of coplanar electrically conductive elongated ribbons or strips in a relationship allowing movements following the pair of coplanar electrically conductive elongated ribbons or strips while maintaining a close surface-to-surface proximity relationship therebetween, measures position of the electrically conductive stub planar member relative to the pair of coplanar electrically conductive elongated ribbons or strips, as the phase angle difference between two output alternating electrical signals respectively taken off from the two opposite extremities of a first of the pair of coplanar electrically conductive elongated ribbons or strips varies in a substantially linear relationship as a function of position of the electrically conductive stub planar member; wherein the two output alternating electrical signals are generated by an input alternating electrical signal supplied to both of the two opposite extremities of a second of the pair of coplanar electrically conductive elongated ribbons or strips as the electrically conductive stub planar member capacitively couples two electric currents being transmitted respectively through the pair of coplanar electrically conductive elongated ribbons or strips to one another. In the afore-mentioned position sensor, the phase angle difference between the two output alternating electrical signals varies in a highly sensitive manner when the interface distance between the combination of the pair of coplanar electrically conductive elongated ribbons or strips and the electrically conductive stub planar member is changed within a range of small values of the interface distance at a fixed position of the electrically conductive stub planar member. As a consequence, the position sensor disclosed in the parent application Ser. No. 08/133,349 can be structurally modified to provide a highly sensitive interface distance sensor measuring the interface distance in a range of small values of the interface distance, which interface sensor measures the interface distance in an error-free manner independent of drifts in the operating characteristics of the electric circuit elements executing the measurement as the phase angle difference between the two alternating electrical signals determining the interface distance is virtually immune to errors introduced by the drifts in the operating characteristics of the electric circuit elements executing the measurement of the interface distance sensor. Such an interface distance sensor has a perfect application in measuring thickness of thin sheets such as paper, metallic or plastic sheets, etc. and in measuring pressures or differential pressures imposing a pressure loading across one of the two planar structures respectively comprising the pair of coplanar electrically conductive elongated ribbons or strips and the electrically conductive stub planar member.

Figure 1:
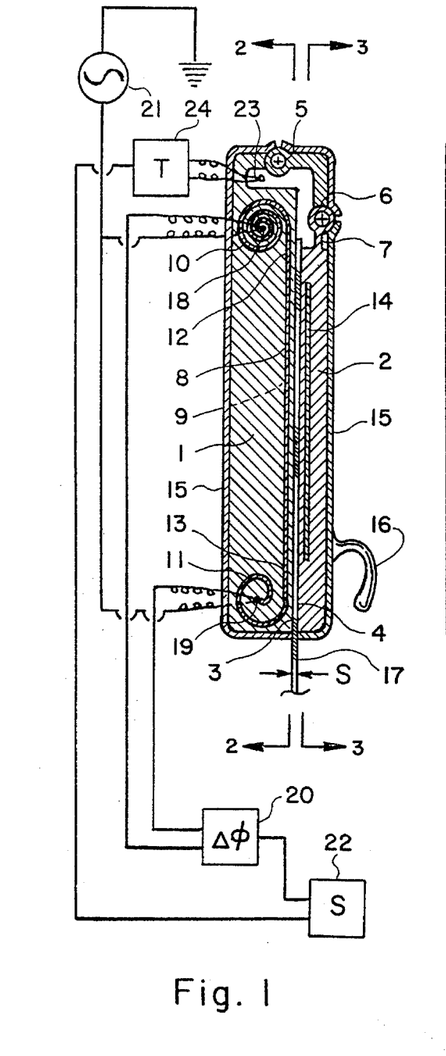
FIG. 1 illustrates a cross section of an embodiment of the interface distance sensor of the present invention.

In FIG. 1, there is illustrated a cross section of an embodiment of the interface distance sensor of the present invention, that comprises two planar blocks 1 and 2 made of an electrically nonconducting rigid and hard material, which two blocks 1 and 2 are mechanically joined to one another in a relationship wherein the two blocks 1 and 2 can be separated from one another in directions perpendicular to the reference surfaces 3 and 4 of the two blocks 1 and 2 over a small distance without experiencing any rotative shifting movements therebetween in directions parallel to the two reference surfaces 3 and 4 of the two blocks 1 and 2. In the particular illustrative embodiment, a combination of dual hinges 5 and 6 of limited pivoting angles, and the thin bendable section 7 included in the block 2 provides such a mechanical joint between the two blocks 1 and 2. The surface of the first block 1 constituting the first of the two reference surfaces 3 and 4 includes flat sections of a pair of electrically conductive elongated planar members 8 and 9 (the element 9 is not visible in this cross section view as it is hidden behind the element 8) in the shape of ribbons, strips or flat bars, which are disposed parallel and closely adjacent to the first reference surface 3 or right on the first reference surface 3, wherein each flat section of the pair of electrically conductive elongated planar members 8 and 9 has two coiled extensions 10 and 11 of unequal lengths respectively extending from the two opposite extremities 12 and 13 of the flat section of the electrically conductive elongated planar member 8 or 9. The best result is obtained when each of the pair of electrically conductive elongated planar members 8 and 9 is made of a thin sheet of material having a very high ohmic resistance, and includes one coiled extension 10 of much greater length than the length of the other coiled extension 11. Such electrically conductive elongated planar members 8 and 9 can be made of a mixture of electrically conductive metallic or carbon powders or ceramics and an electrically nonconductive synthetic base material heated and pressed into a thin ribbon, strip, or bar. In an alternative design, the coiled extensions 10 and 11 can be replaced by folded extensions, wherein the extremities of the electrically conductive elongated planar member 8 or 9 is folded into a shape having a zig-zag geometry. The second of the two reference surfaces 3 and 4 provided by the second block 2 includes a thin electrically conductive stub planar member 14 disposed parallel and closely adjacent to the second reference surfaces 4 or right on the reference surface 4, wherein the combination of the flat sections of the pair of electrically conductive elongated planar members 8 and 9, and the electrically conductive stub planar member 14 cover a mutually common area in a close surface-to-surface proximity relationship therebetween. In general, the best result is obtained when the electrically conductive stub planar member 14 is made of a thin metallic sheet having a very low ohmic resistance. The combination of the pair of electrically conductive elongated planar members 8 and 9, and the electrically conductive stub planar member 14 is enclosed within an enclosure 15 constructed into a structure allowing the separation of the two reference surfaces 3 and 4 from one another over a small distance, which enclosure 15 made of electrically conductive solid or meshed sheets provides an electromagnetic shielding from the ambient environment for the combination of the electrically conductive elongated and stub planar members 8, 9 and 14. The handle 16 affixed to the second block 2 is used to separate the second block 2 from the first block 1 in sliding a test sheet 17 requiring the measurement of its thickness. It is generally required to have a bias spring or weight automatically providing a constant compressive force pressing the two reference surfaces 3 and 4 with a required preset compressive force, which bias spring or weight is not shown in the particular illustrative embodiment as such a matter belongs to the domain of matter of design.

In the particular illustrative embodiment of the interface distance sensor shown in FIG. 1, the ends 18 and 19 or the two coiled extensions 10 and 11 of the electrically conductive elongated planar member 8 are respectively connected to two input terminals of a phase difference measuring device 20 that measures a phase angle difference between two output alternating electrical signals respectively taken off from the ends 18 and 19 of the two coiled extensions 10 and 11 of the electrically conductive elongated member 8, while an input alternating electrical signal provided by an alternating electrical signal generator 21 is supplied to the ends of the two coiled extensions of the electrically conductive elongated member 9. A data processor 22 receiving the information on the phase angle difference between the two output alternating electrical signals from the phase difference measuring device 20 determines the interface distance or the thickness of the test sheet 17 as a function of the phase angle difference by using an empirically obtained mathematical relationship therebetween. The interface distance sensor may include a temperature sensor comprising a temperature probe 23 and a transducer 24, whereby the data processor 22 receiving information on the temperature makes a temperature compensation to the measured value of the interface distance or to the thickness of the test sheet 17 in order to eliminate an error arising from the change of the specific ohmic resistances of the pair of electrically conductive elongated planar members 8 and 9 due to the changing temperature. It should be understood that, while the best result is obtained when the pair of electrically conductive elongated planar members 8 and 9 are made of thin sheets having a very high value of the specific ohmic resistance per unit area thereof and the electrically conductive stub planar member 14 is made of a metallic sheet having a very low specific ohmic resistance, these electrically conductive elongated and stub planar members can be made of material having a finite value of specific ohmic resistance such as thin metallic films respectively deposited on the two reference surfaces 3 and 4 and lined with a film of electrically insulating material in an alternative design. In an alternative design, as many as three out of the four coiled or folded extremities 10, 11, etc. respectively belonging to the coplanar pair of electrically conductive elongated planar members 8 and 9 may be omitted.

The phase difference measuring device 20 may determine the phase angle difference between the two output alternating electrical signals by one of the following four methods: The first method is to measure the time interval between two consecutive zero crossings respectively by the two alternating electrical signals and take the ratio of the time interval between the two consecutive zero crossings to the period of the alternating electrical signals, which ratio is equal to the phase angle difference between the two alternating electrical signals. The second method is to form differential and additive combinations of the two alternating electrical signals having a matched amplitude to one another, and take the ratio of the amplitude of the differential combination to the amplitude of the additive combination of the two alternating electrical signals which ratio is equal to the tangent of one half of the phase angle difference. The third method is to obtain the ratio of a first value of the first of the two alternating electrical signals measured at an instant when the second of the two alternating electrical signals reaches a zero value to a second value of the first alternating signal measured at another instant when the second alternating electrical signal reaches a peak value, which ratio is equal to the tangent of the phase angle difference between the two alternating electrical signals. The fourth method uses the following relationship between the phase angle difference $\Delta\phi$, and the amplitudes of differential and additive combinations of the two alternating electrical signals and the amplitude of the two alternating electrical signals themselves:

$$\Delta\phi = 2\tan^{-1}\sqrt{\frac{[(AMP \cdot \Delta E_i)/(AMP \cdot \Sigma E_i)]^2 - [(\Delta AMP \cdot E_i)/(\Sigma AMP \cdot E_i)]^2}{1 - [(AMP \cdot \Delta E_i)/(AMP \cdot \Sigma E_i)]^2 [(\Delta AMP \cdot E_i)/(\Sigma AMP \cdot E_i)]^2}},$$

where $(AMP \cdot \Delta E_i)$ and $(AMP \cdot \Sigma E_i)$ are respectively the amplitudes of the differential and additive combinations of the two alternating electrical signals, and $(\Delta AMP \cdot E_i)$ and $(\Sigma AMP \cdot E_i)$ are respectively the difference between and the sum of the amplitudes of the two alternating electrical signals. It is readily recognized that the fourth method defined by the above-presented equation reduces to the afore-mentioned second method, when the amplitudes of the two alternating electrical signals are matched to one another. Of course, the phase difference measuring device 20 may determine the phase angle difference between the two alternating electrical signals by using other method known at the present time or to be known in the future.

Figure 2:
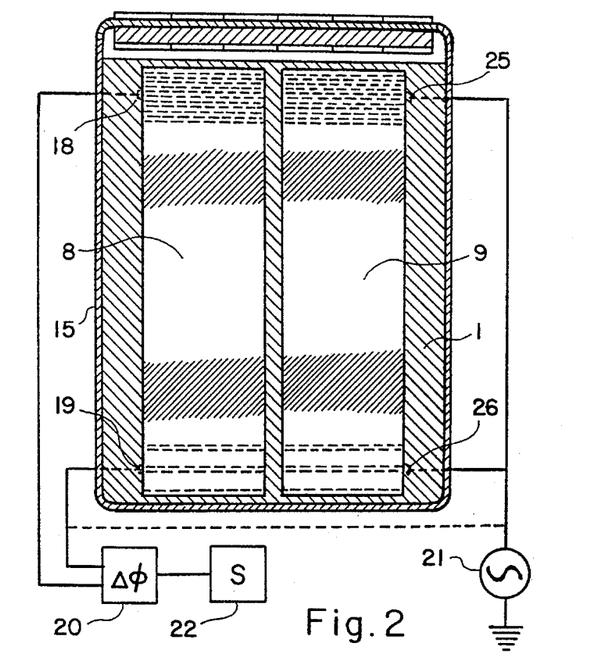
FIG. 2 illustrates another cross section of the embodiment shown in FIG. 1.

In FIG. 2, there is illustrated another cross section of the embodiment of the interface distance sensor shown in FIG. 1, which cross section taken along plane 2—2 as shown in FIG. 1 shows the first electrically conductive elongated planar member 8 with two opposite ends 18 and 19 respectively connected to the two input terminals of the phase difference measuring device 20, and the second electrically conductive elongated planar member 9 with two opposite ends 25 and 26 connected to an output terminal of the alternating signal generator 21, which first and second electrically conductive elongated planar members 8 and 9 are disposed closely adjacent to or right at the first reference surface 3 provided by the first block 1. It should be noticed that each of the coplanar pair of electrically conductive elongated planar members 8 and 9 includes the first coiled or folded extremity terminated at the end 18 or 25, that has a length much greater than the length of the second coiled or folded extremity terminated at the end 19 or 26. In an alternative design, the second of the two output alternating electrical signals can be taken off from the lead wire supplying the input alternating electrical signal to the second electrically conductive elongated planar member 9 rather than from the second end 19 of the electrically conductive elongated planar member 8 as exemplified by the wiring exemplified by the broken line connecting the output terminal of the alternating electrical signal generator 21 to the phase difference measuring device 20, wherein the input alternating electrical signal may be supplied only to the first end 25 of the second electrically conductive elongated planar member 9.

Figure 3:
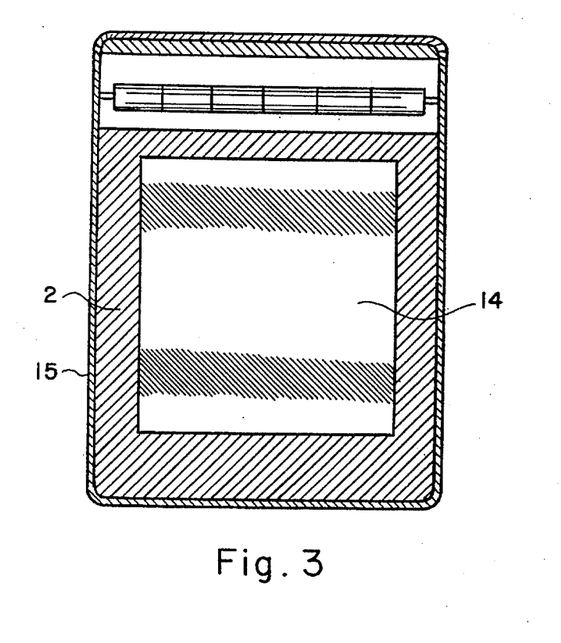
FIG. 3 illustrates a further cross section of the embodiment shown in FIG. 1.

In FIG. 3, there is illustrated a further cross section of the embodiment of the interface distance sensor shown in FIG. 1, which cross section taken along plane 3—3 as shown in FIG. 1 shows the electrically conductive stub planar member 14 disposed closely adjacent to or right on the second reference surface 4 provided by the block 2, wherein the electrically conductive stub planar member 14 embedded in or affixed to the second block 2 overlaps the combination of the coplanar pair of electrically conductive elongated planar members 8 and 9 embedded in or affixed to the first block 1 when the two reference surfaces 3 and 4 respectively provided by the first and second blocks 1 and 2 are brought together as illustrated in FIG. 1.

Figure 4:
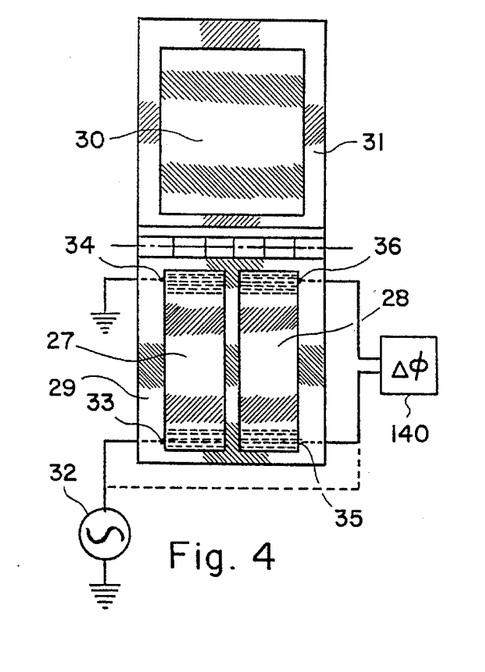
FIG. 4 illustrates a design alternative to the interface distance sensor shown in FIG. 1.

In FIG. 4, there is illustrated a design alternative to the interface distance sensor shown in FIG. 1. In this particular illustrative embodiment, the coplanar pair of electrically conductive elongated planar members 27 and 28, which are coated with a thin film of electrically insulating material, are pressed and bonded onto the first reference surface 29, while the electrically conductive stub planar member 30 coated with a thin film of electrically insulating material is pressed and bonded onto the second reference surface 31. As a consequence, the first reference surface defined by the exposed surfaces of the coplanar pair of insulated electrically conductive elongated planar members 27 and 28, and the second reference surface defined by the exposed surface of the insulated electrically conductive stub planar member 30 are disposed very close to one another in a parallel relationship which arrangement provides a greatly increased sensitivity in measuring the interface distance between the two reference surfaces. The alternating electrical signal generator 32 supplies the input alternating electrical signal only to one of the two opposite ends 33 and 34 of the second electrically conducting elongated planar member 27 as the other of the two opposite ends 33 and 34 is grounded. The phase difference measuring device 140 measures the phase angle difference between two alternating electrical signals respectively taken off from the two opposite ends 35 and 36 of the first electrically conductive elongated planar member 28. In an alternative design, the second output alternating electrical signal can be taken off from the lead wire supplying the input alternating electrical signal to the second electrically conductive elongated planar member 27 rather than from the first end 35 of the first electrically conductive elongated planar member 28 as exemplified by the broken line connecting the alternating electrical signal generator 32 to the phase difference measuring device 140, wherein the grounding of the second end 34 of the second electrically conductive elongated planar member may be omitted.

Figure 5:
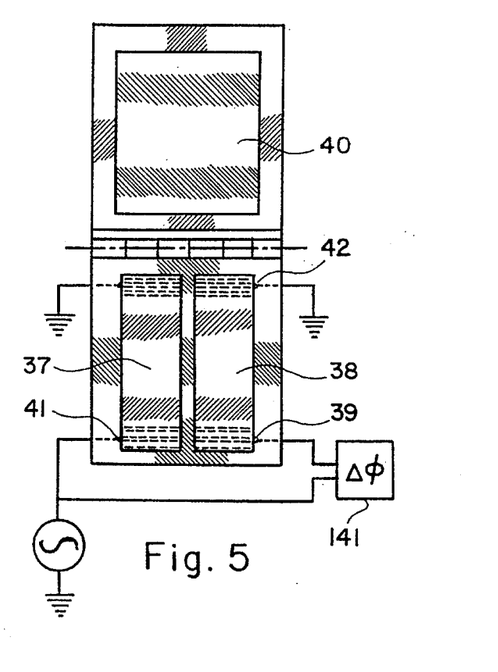
FIG. 5 illustrates another design alternative to the interface distance sensor shown in FIG. 1.

In FIG. 5, there is illustrated another design alternative to the interface distance sensor shown in FIG. 1. This particular illustrative embodiment has the same construction as that of the embodiment shown in FIG. 4 with one exception being the electrical connection included in the second of the coplanar pair of electrically conductive elongated planar members 37 and 38, wherein the first end 39 thereof is connected to the phase difference measuring device 141 that now measures the phase angle difference between the output alternating electrical signal taken off from the first end 39 of the electrically conductive elongated planar member 38 and the input alternating electrical signal supplied to one end 41 of the electrically conductive elongated planar member 37. In an alternative design, the two output alternating electrical signals can be taken off respectively from one end of the electrically conductive elongated planar member 38 and the electrically conductive stub planar member 40. The other end 42 of the electrically conductive elongated planar member 38 is grounded. It should be mentioned that, in an alternative design to the embodiment shown in FIG. 4 or 5, the grounding of one end of the respective electrically conductive elongated planar member may be omitted as the apparatus works without any such grounding circuit or circuits.

Figure 6:
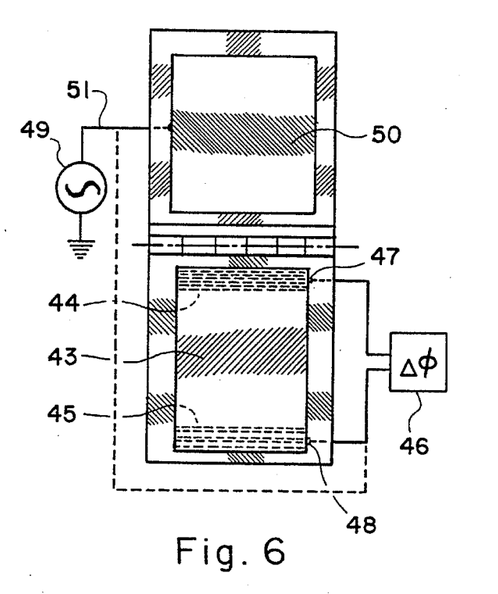
FIG. 6 illustrates another embodiment of the interface distance sensor of the present invention.

In FIG. 6, there is illustrated another embodiment of the interface distance sensor of the present invention. In this particular illustrative embodiment, the coplanar pair of electrically conductive elongated planar members included in the embodiments shown in FIGS. 1, 4 and 5 are merged into a single electrically conductive elongated planar member 43 having two coiled or folded opposite extremities 44 and 45 respectively terminated by two ends 47 and 48 of the single electrically conductive elongated planar member 43. The phase difference measuring device 46 measures the phase angle difference between two output alternating electrical signals respectively taken off from the two opposite ends 47 and 48 of the single electrically conductive elongated planar member 43. The alternating electrical signal generator 49 supplies the input alternating electrical signal to the electrically conductive stub planar member 50 through a lead wire 51. When the electrically conductive stub planar member 50 is made of a thin metallic sheet of a low specific ohmic resistance, the lead wire 51 can be connected to any part thereof; while the lead wire 51 should be connected to the geometrical center of the electrically conductive stub planar member 50, or it can be connected to a metallic rim disposed following the edges of the electrically conductive stub planar member 50 when it is made of a material having a high ohmic resistance. In an alternative design, the second output alternating electrical signal taken off from the second end 48 of the electrically conductive elongated planar member 43 may be replaced by an alternating electrical signal branched off from the input alternating electrical signal supplied to the electrically conductive stub planar member 50 as exemplified by the broken line connecting the alternating electrical signal generator 49 to the phase difference measuring device 46.

Figure 7:
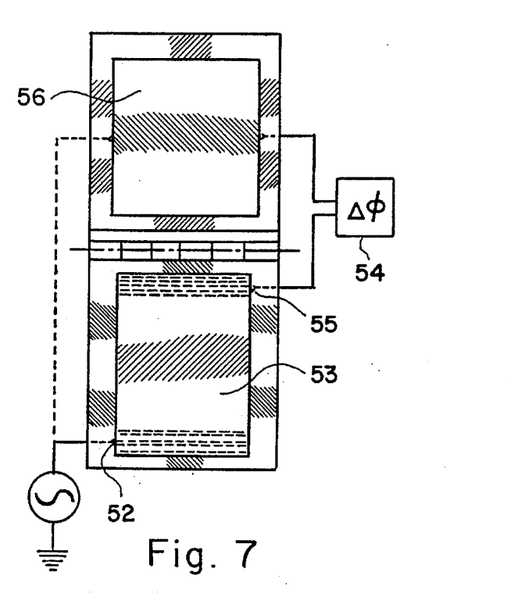
FIG. 7 illustrates a design alternative to the interface distance sensor shown in FIG. 6.

In FIG. 7, there is illustrated a design alternative to the interface distance sensor shown in FIG. 6, which design alternative has the same construction as that of the embodiment shown in FIG. 6 with one exception that is the input alternating electrical signal supplied to the first end 52 of the single electrically conductive elongated planar member 53 and the phase difference measuring device 54 measuring the phase angle difference between two output alternating electrical signals respectively taken off from the second end 55 of the single electrically conductive elongated planar member 53 and the electrically conductive stub planar member 56. In an alternative design, the input alternating electrical signal may be supplied to the electrically conductive stub planar member rather than or in addition to one end 52 of the electrically conductive elongated planar member 53 as exemplified by the broken line connecting the alternating electrical signal generator to the electrically conductive stub planar member 56.

Figure 8:
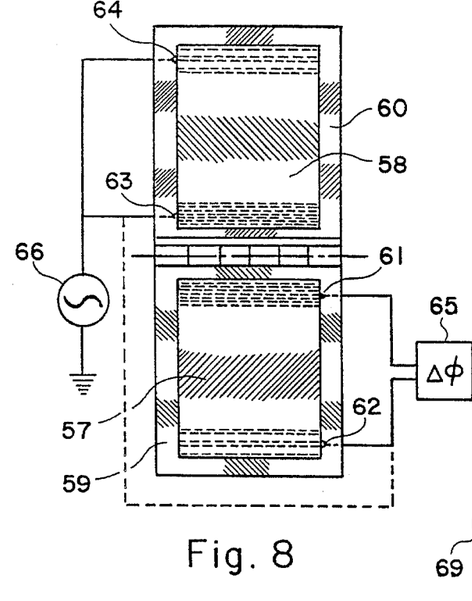
FIG. 8 illustrates a further embodiment of the interface distance sensor of the present invention.

In FIG. 8, there is illustrated a further embodiment of the interface distance sensor of the present invention comprising two electrically conductive elongated planar members 57 and 58 respectively defining the two reference surfaces respectively provided by the pair of blocks 59 and 60; wherein the midportions of the first and second electrically conductive elongated planar members 57 and 58 come together in a closely adjacent surface-to-surface proximity relationship, when the two blocks 59 and 60 are brought near to one another as exemplified by the assembly thereof shown in FIG. 1. The first and second electrically conductive elongated planar members 57 and 58 respectively have two coiled or folded opposite extremities 61 and 62, and 63 and 64. The two output alternating electrical signals are respectively taken off from the two opposite ends of the first electrically conductive elongated planar member 57, and the phase difference measuring device 65 measures the phase angle difference therebetween, while the input alternating electrical signal is supplied to one or both of the two opposite ends of the second electrically conductive elongated planar member 58. In an alternative design, the two output alternating electrical signals may be taken off respectively from one of the two opposite ends of the first electrically conductive elongated planar member 57 and one of the two opposite ends of the second electrically conductive elongated planar member 58, which one of the two opposite ends is not connected to the alternating electrical signal generator 66. In an alternative design, the second output alternating electrical signal taken off from the end of the coiled or folded extremity 62 of the electrically conductive elongated planar member 57 may be replaced by an alternating electrical signal branched off from the input alternating electrical signal supplied to the electrically conductive elongated planar member 58, wherein the input alternating electrical signal may be supplied only to the end of the coiled or folded extremity 64 of the electrically conductive elongated planar member 58.

Figure 9:
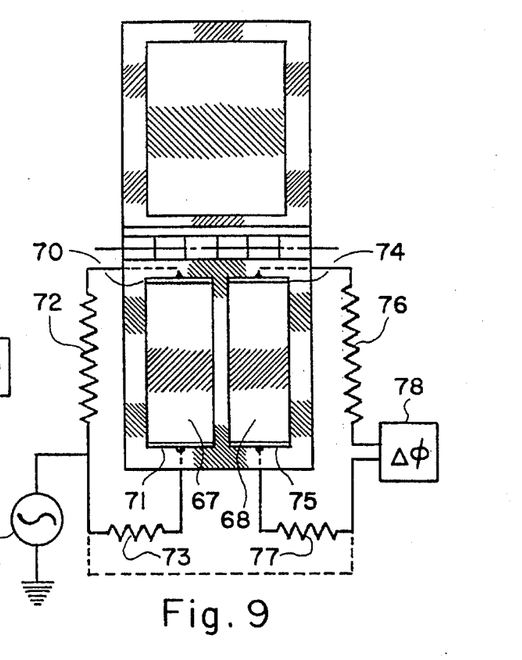
FIG. 9 illustrates an embodiment of the interface distance sensor equivalent to the embodiment shown in FIG. 4.

In FIG. 9, there is illustrated an embodiment of the interface distance sensor equivalent to the embodiment shown in FIG. 1. The coplanar pair of electrically conductive elongated planar members 8 and 9 included in the embodiment shown in FIG. 1 are now respectively replaced by a coplanar pair of electrically conductive oblong planar members 67 and 68. The alternating electrical signal generator 69 supplies the input alternating electrical signal to the two opposite ends 70 and 71 of the first electrically conductive oblong planar member 67 through two resistors 72 and 73 having different values of ohmic resistances and respectively connected to the two opposite ends 70 and 71 of the first electrically conductive oblong planar member 67, wherein the two resistors 72 and 73 respectively play the roles of the two coiled or folded opposite extremities 10 and 11 of the electrically conductive elongated planar member 8 included in the embodiment shown in FIG. 1. The two output alternating electrical signals are now taken off respectively from the two opposite ends 74 and 75 of the second electrically conductive oblong planar member 68 respectively through two resistors 76 and 77 having two different values of ohmic resistance respectively connected to the two opposite ends 74 and 75 of the second electrically, conductive oblong planar member 68, wherein the two resistors 76 and 77 respectively play the roles of the two coiled or folded opposite extremities of the electrically conductive elongated planar member 9 included in the embodiment shown in FIG. 1. The phase difference measuring device 78 measures the phase angle difference between the two output alternating electrical signals. In this particular embodiment, the coplanar pair of electrically conductive oblong planar members 67 and 68 can be made of metallic sheets having low specific ohmic resistance, or of compound material sheets having high specific ohmic resistance. When one or both of the coplanar pair of electrically conductive oblong planar members 67 and 68 are made of compound material sheets having high specific ohmic resistance, the two opposite extremities 70 and 71, or 74 and 75 thereof should respectively include metallic end edges; whereby the alternating electrical signal or signals are supplied thereto or drawn therefrom in a uniformly distributed manner over the width of each of the electrically conductive oblong planar members 67 and 68. In an alternative design, the two lead wires respectively connecting the alternating electrical signal generator 69 to the second end 71 of the first electrically conductive oblong planar member 67, and the phase difference measuring device 78 to the second end 75 of the second electrically conductive oblong planar member 68 can be omitted; and the second alternating electrical signal may be taken off from the lead wire supplying the input alternating electrical signal to the first end 70 of the first electrically conductive oblong planar member 67 as exemplified by the broken line connecting the alternating electrical signal generator 69 to the phase difference measuring device 78. In another alternative design, the resistors 73 and 77 may be omitted.

Figures 10, 11:
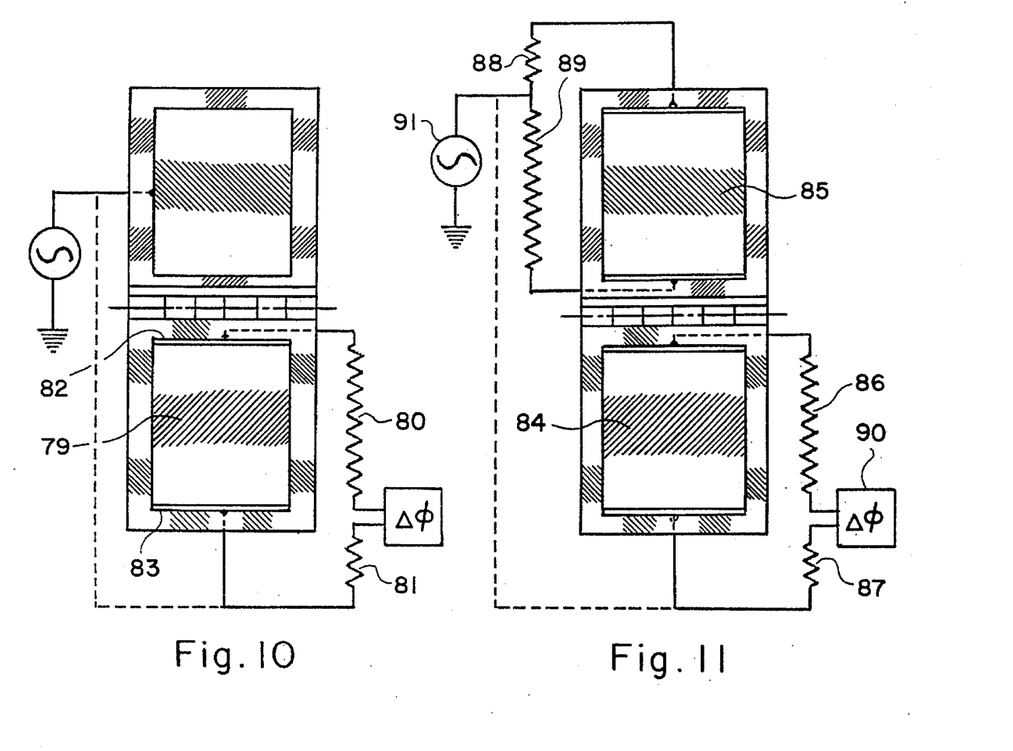
FIG. 10 illustrates an embodiment of the interface distance sensor equivalent to the embodiment shown in FIG. 6.
FIG. 11 illustrates an embodiment of the interface distance sensor equivalent to the embodiment shown in FIG. 8.

In FIG. 10, there is illustrated an embodiment of the interface distance sensor equivalent to the embodiment shown in FIG. 6. The electrically conductive elongated planar member 43 with two coiled or folded opposite extremities 44 and 45 included in the embodiment shown in FIG. 6 is now replaced by the electrically conductive planar member 79 with two resistors 80 and 81 respectively connected to the two opposite sides 82 and 83 of the electrically conductive planar member 79. In an alternative design, the lead wire connecting the second end 83 of the electrically conductive planar member 79 may be replaced by a lead wire connecting the alternating electrical signal generator to the phase difference measuring device as exemplified by the broken line. In another alternative design, the resistor 81 may be omitted.

In FIG. 11, there is illustrated an embodiment of the interface distance sensor equivalent to the embodiment shown in FIG. 8. In this particular illustrative embodiment, a coplanar pair of electrically conductive planar members 84 and 85 respectively including the pairs of resistors 86 and 87, and 88 and 89 respectively connected to the two opposite ends thereof, replace the coplanar pair of electrically conductive elongated planar members 57 and 58 respectively including the coiled or folded opposite extremities employed in the embodiment shown in FIG. 8. In an alternative design, the lead wire that connects the second end of the electrically conductive planar member 84, including the resistor 87, can be replaced by a lead wire connecting the alternating electrical signal generator 91 to the phase difference measuring device 90 as exemplified by the broken line, wherein the lead wire including the resistor 88 can be omitted. In another alternative design, the resistors 87 and 88 may be omitted.

Figure 12:
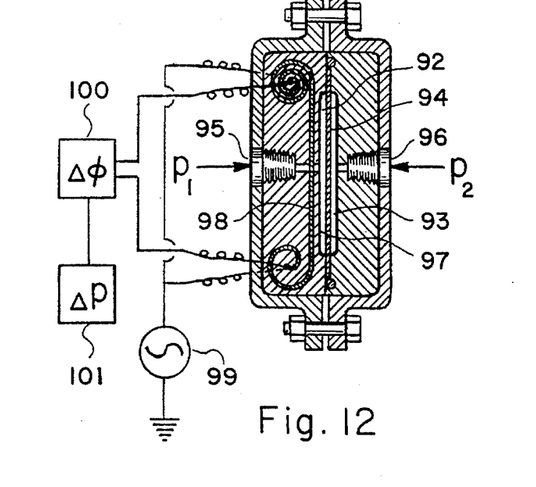
FIG. 12 illustrates a cross section of an embodiment of the pressure sensor of the present invention.

In FIG. 12, there is illustrated a cross section of an embodiment of the pressure sensor of the present invention employing the construction of and operating on the principles of the interface distance sensor shown and described in conjunction with FIGS. 1 through 3. This particular illustrative embodiment of the pressure sensor comprises two pressure compartments 92 and 93 separated from one another by a thin pressure barrier planar member 94, which two pressure compartments 92 and 93 respectively includes two pressure ports 95 and 96 receiving two pressures $P_1$ and $P_2$. The pressure barrier planar member 94 is made of or includes the electrically conductive stub planar member placing the same role as that of the element 14 included in the interface distance sensor shown in FIG. 1, while a planar wall 97 of the first pressure compartment 92 disposed parallel and closely adjacent to the pressure barrier planar member 94 includes the coplanar pair 98 of electrically conductive elongated planar members disposed parallel and closely adjacent to or right on the surface of the end wall 97, wherein the coplanar pair 98 of the electrically conductive elongated planar members play the same role as the elements 8 and 9 included in the interface distance sensor shown in FIG. 1. The alternating electrical signal generator 99 supplies an input alternating electrical signal to one or both of the two opposite ends of the first of the coplanar pair 98 of electrically conductive elongated planar members, while the phase difference measuring device 100 measures the phase angle difference between two alternating electrical signals respectively taken off from the two opposite ends of the second of the coplanar pair 98 of electrically conductive elongated planar members as explained in FIG. 1. A data processor 101 determines numerical values of the pressure difference between $P_1$ and $P_2$ as a function of the phase angle difference between the two alternating electrical signals by using an empirically obtained mathematical relationship therebetween. It is generally preferred or required to supply the greater of the two pressures $P_1$ and $P_2$ into the pressure compartment 92 as the pressure compartment 92 has a very small distance of separation between the side wall 97 thereof and the pressure barrier planar member 94 and consequently, the pressure compartment 92 is better adapted to an expansion than a contraction. When one of the two pressure compartments 92 and 93 is kept at the state of vacuum, the measured value of the differential pressure across the pressure barrier planar member 94 is equal to the absolute pressure. When one of the two pressure compartments 92 and 93 is open to the atmospheric pressure, the measured value of the differential pressure is equal to the gauge pressure. In an alternative design, the coplanar pair 98 of electrically conductive elongated planar members may be included in the pressure barrier planar member 94, while the electrically conductive stub planar member included in the pressure barrier planar member 94 is now included closely adjacent to or right on the surface of the end wall 97 of the first pressure compartment 92. It can be readily realized that the pressure sensor shown in FIG. 12 is a type of the interface distance sensor, wherein the interface distance varies due to changing values of the differential pressure across the pressure barrier planar member 94. Therefore, it becomes immediately clear that any one of the various embodiments of the interface distance sensor shown in FIGS. 1 through 11 and the different design variations thereof can be used to construct the various embodiments of the pressure sensors shown in FIGS. 12 through 20 and other modified versions thereof. It should be understood that, firstly, it is generally preferred to include the electrically conductive stub planar member into the pressure barrier planar member as the electrically conductive stub planar member made of a corrosion resistant alloy steel having a high spring constant and coated with a thin layer of electrically insulating material is structurally perfect in providing the pressure barrier planar member without requiring any other structural additions thereto, and secondly, at least one of the two interfaces respectively provided by the pressure barrier planar member 94 and the end wall 97 of the first pressure compartment 92 should have one or a plurality of minute boss structures extending above the interface whereby the pressure barrier planar member 94 can be disposed as closely as possible to the end wall 97 of the first pressure compartment 92 without blocking off the penetration of the first pressure $P_1$ into the minute spacing therebetween.

Figure 13:
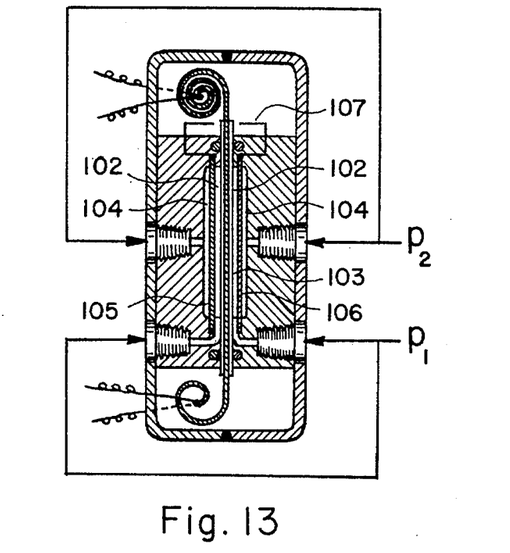
FIG. 13 illustrates a cross section of another embodiment of the pressure sensor of the present invention.

In FIG. 13, there is illustrated a cross section of another embodiment of the pressure sensor of the present invention operating on the same principles as those described in conjunction with the pressure sensor shown in FIG. 12. This particular embodiment of the pressure sensor comprises a first pressure compartment 102 straddling a planar structure 103 comprising or including a coplanar pair of electrically conductive elongated planar members such as the elements 8 and 9, 27 and 28, or 37 and 38, respectively included in the embodiment shown in FIGS. 1, 4 and 5, and a second pressure compartment 104 separated from the first pressure compartment 102 by a parallel pair of pressure barrier planar members 105 and 106 in a relationship wherein the second pressure compartment 104 straddles the combination of the pair of pressure barrier planar members 105 and 106, the first pressure compartment 102, and the planar structure 103. The pair of pressure barrier planar members 105 and 106 disposed respectively parallel and closely adjacent to the two opposite side surfaces of the planar structure 103 comprises or constitutes a structurally separated version of the electrically conductive stub planar member playing the same role as that of the electrically conductive stub planar member 14, 30, etc. respectively included in the embodiments shown in FIGS. 1, 4 and 5. As an option, the two pressure barrier planar members 105 and 106 may be electrically connected to one another by a lead wire 107. It should be understood that the planar structure 103 may have a greater thickness than the dimension thereof shown in the particular illustrative embodiment, wherein the pair of electrically conductive elongated planar members are included in a folded arrangement in such a way that two sections thereof are disposed in a parallel and closely adjacent relationship respectively to the two opposite side surfaces of the planar structure 103. When the planar structure 103 is made up of the coplanar pair of electrically conductive elongated planar members physically separated from one another or has a structure that does not constitute a pressure barrier thereacross, only one pressure port supplying pressure $P_1$ to the first pressure compartment 102 is required instead of the pair thereof shown in the particular illustrative embodiment. It is readily recognized that the planar structure 103 may comprise or include the single electrically conductive elongated planar member such as the element 43 or 53 included in the embodiment shown in FIGS. 6 or 7 instead of the coplanar pair of the electrically conductive elongated planar members. Therefore, the particular illustrative embodiment of the pressure sensor shown in FIG. 13 may be constructed by incorporating thereinto any one of the various embodiments of the interface distance sensors shown in FIGS. 1 through 11 and the different design alternatives thereof.

Figure 14:
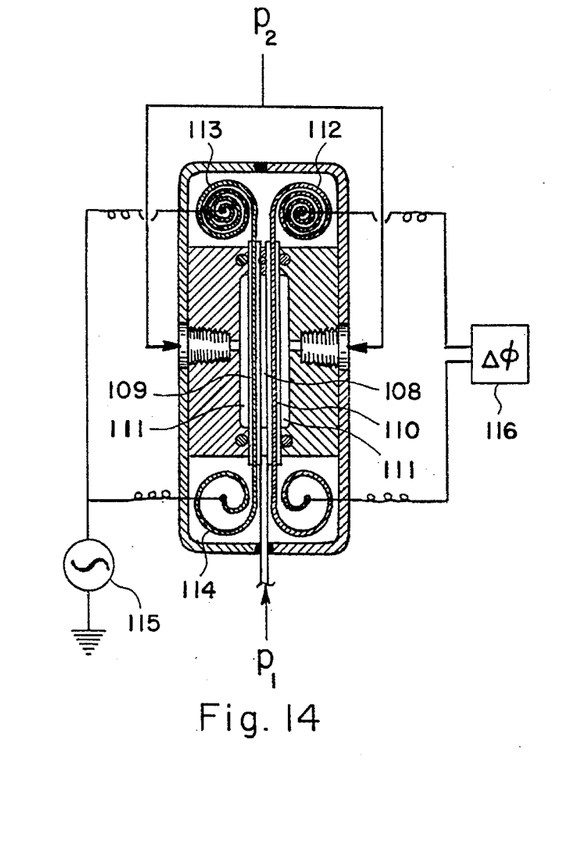
FIG. 14 illustrates a cross section of a further embodiment of the pressure sensor of the present invention.

In FIG. 14, there is illustrated a cross section of a further embodiment of the pressure sensor of the present invention that incorporates the structural arrangement of the interface distance sensor shown in FIG. 8 into the pressure sensor. This particular illustrative embodiment of the pressure sensor comprises a first pressure compartment 108 located intermediate a pair of pressure barrier planar members 109 and 110 disposed in a parallel and closely adjacent relationship to one another, and a second pressure compartment 111 separated from the first pressure compartment 108 by the pair pressure barrier planar members 109 and 110, and straddling the combination of the pair of the pressure barrier planar members 109 and 110, and the first pressure compartment 108. The pair of pressure barrier planar members 109 and 110 respectively comprises or includes two electrically conductive elongated planar members respectively equivalent to the elements 57 and 58 included in the embodiment shown in FIG. 8, each of which two electrically conductive elongated planar members includes two coiled or folded opposite extremities 113 and 114. The two opposite ends of the first electrically conductive planar member constituting or included in the first pressure barrier planar member 109 are electrically connected to the alternating electrical signal generator 115, while the two opposite ends of the second electrically conductive elongated planar member constituting or included in the second pressure barrier planar member 110 are electrically connected respectively to the two input terminals of the phase difference measuring device 116 that measures the phase angle difference between two output alternating electrical signals respectively taken off from the two opposite ends of the second electrically conductive elongated planar member constituting or included in the second pressure barrier planar member 110. A data processor such as the element 101 included in the embodiment shown in FIG. 12 determines values of the differential pressure between the two pressure compartments 108 and 112. It should be mentioned that as many as three out of the four coiled or folded extremities 113, 114, etc. belonging to the two electrically conductive elongated planar members respectively constituting or included in the pair of pressure barrier planar members 109 and 110 may be omitted by retaining only one element 113 or two elements 112 and 113 thereof. The electric circuits employed in the particular illustrative embodiment of the pressure sensor shown in FIG. 14 may be modified as those of the alternative designs of the embodiment shown in FIG. 8, which alternative designs are described in conjunction with FIG. 8. It is readily recognized that one of the pair of pressure barrier planar members 109 and 110 can be supported or bound to a rigid wall as exemplified by the embodiment shown in FIG. 12, whereby only one of the pair of pressure barrier planar members 109 and 110 experiences deflection under the pressure loading thereacross. The different embodiments of the pressure sensor shown in FIGS. 12, 13 and 14, and the various design alternatives thereof may employ one of various combinations of the electrically conductive planar members included in the embodiments shown in FIGS. 9, 10 and 11, and different design alternatives thereof in place of the combination of the electrically conductive elongated and stub planar members employed in the particular illustrative embodiments shown in FIGS. 12, 13 and 14.

Figure 15:
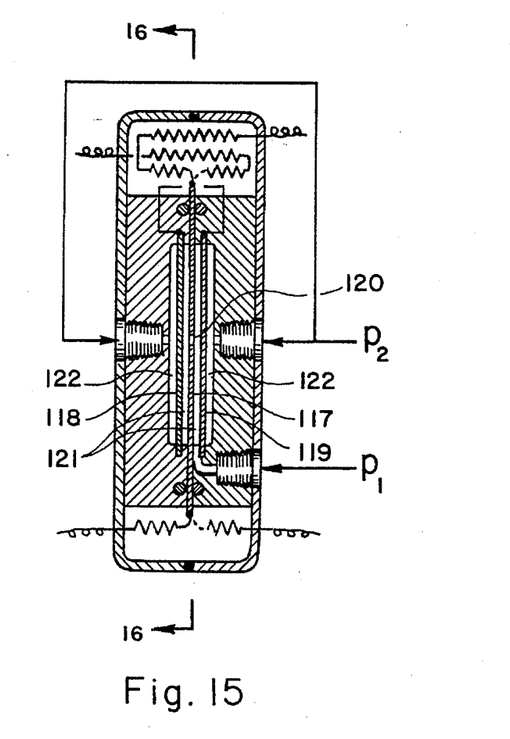
FIG. 15 illustrates a cross section of an embodiment of the pressure sensor equivalent to the embodiment shown in FIG. 13.

In FIG. 15, there is illustrated a cross section of an embodiment of the pressure sensor equivalent to the embodiment shown in FIG. 13. This particular illustrative embodiment results when the pressure sensor shown in FIG. 13 is modified in such a way that a coplanar pair 117 of oblong planar members equivalent to the elements 67 and 68 included in the embodiment shown in FIG. 9 now replaces the pair of electrically conductive elongated planar members constituting or included in the planar structure 103 included in the pressure sensor shown in FIG. 13. In an alternative design, the coplanar pair 117 of electrically conductive oblong planar members may be replaced by an oval or circular combination of the electrically conductive semi-oval or semicircular planar members. It should be mentioned that at least one of the coplanar pair 117 of electrically conductive oblong or semi-oval planar members must include at least one resistor of a very high value equivalent to one of the two resistors 72 and 76 included in the embodiment shown in FIG. 9 in order to provide a high resolution in the measurement of the differential pressure between the two pressures $P_1$ and $P_2$. The pair of pressure barrier planar members 118 and 119 may be made of thin metallic alloy sheets coated with thin electrically insulating layers, which can have a square, oblong, or oval geometry overlapping the coplanar pair 117 of the electrically conductive oblong or semi-oval planar members, which can also be made of metallic alloy sheets coated with thin electrically insulating layers. A hole or opening 120 located intermediate the coplanar pair 117 of the electrically conductive oblong or semi-oval planar members transmits the pressure $P_1$ between two opposite halves of the first pressure compartment 121 respectively located on two opposite sides of the plane including the coplanar pair 117 of the electrically conductive oblong or semi-oval planar members, which first pressure compartment 121 is straddled by the second pressure compartment 122.

Figure 16:
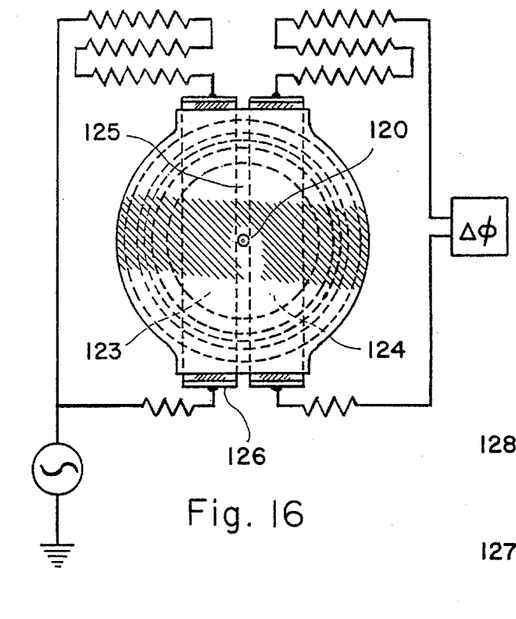
FIG. 16 illustrates another cross section of the pressure sensor shown in FIG. 15.

In FIG. 16, there is illustrated another cross section of the pressure sensor shown in FIG. 15, which cross section taken along plane 16—16 as shown in FIG. 15 shows the coplanar pair of electrically conductive oblong or semi-oval planar members 123 and 124 included in or constituting the planar structure 125 that maintains a constant position of the coplanar pair of electrically conductive oblong or semi-oval planar members 123 and 124 intermediate the two pressure barrier planar members 118 and 119 as illustrated in FIG. 15. In an alternative design, the coplanar pair of electrically conductive oblong or semi-oval planar members 123 and 124 may be disposed across the cross section of the pressure compartment 121 without incorporating them into the planar structure 125 and consequently, the planar structure 125 can be omitted. When the electrically conductive oblong or semi-oval planar members are made of compound material sheets having a high specific ohmic resistance, each end edge thereof should include a metallic edge reinforcement 126 whereby the input and output alternating electrical signals become distributed uniformly over the width of each of the pair of electrically conductive oblong or semi-oval planar members 123 and 124. The electric circuits employed in the particular embodiment of the pressure sensor shown in FIGS. 15 and 16 may be modified as those described in conjunction with the design alternatives of the interface distance sensor shown in FIG. 9.

Figure 17:
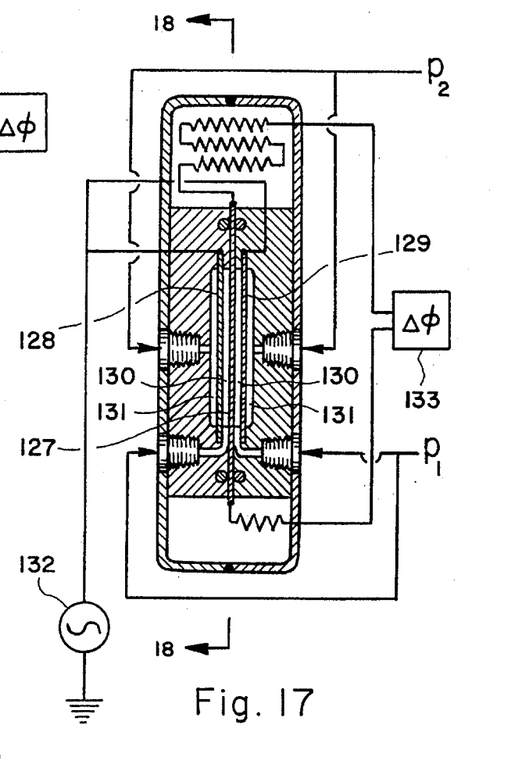
FIG. 17 illustrates a further embodiment of the pressure sensor of the present invention.

In FIG. 17, there is illustrated a cross section of a further embodiment of the pressure sensor of the present invention, that employs the structural arrangement and operating principles of the interface sensor shown in FIG. 10. This particular illustrative embodiment comprises a single electrically conductive oblong or oval planar member 127 playing the same role as that of element 43 included in the interface distance sensor shown in FIG. 10, and a pair of pressure barrier planar members 128 and 129 made of metallic alloy sheets and coated with electrically insulating thin films or layers, which pair of pressure barrier planar members 128 and 129 separating the first pressure compartment 130 from the second pressure compartment 131 play the same role as that of the electrically conductive stub planar member 50 included in the interface distance sensor shown in FIG. 6. The alternating electrical signal generator 132 supplies the input alternating electrical signal to both of the pair of pressure barrier planar members 128 and 129. The phase difference measuring device 133 measures the phase angle difference between two alternating electrical signals respectively taken off from the two opposite extremities of the electrically conductive oblong or oval planar member 127 and respectively through the two different resistors equivalent to the elements 80 and 81 included in the interface distance sensor shown in FIG. 10. Of course, the difference between the two pressures $P_1$ and $P_2$ is determined as a function of the measured phase angle difference. The electric circuits employed in the particular illustrative embodiments shown in FIG. 17 may be modified to those of the alternative designs described in conjunction with the interface distance sensor shown in FIG. 10.

Figure 18:
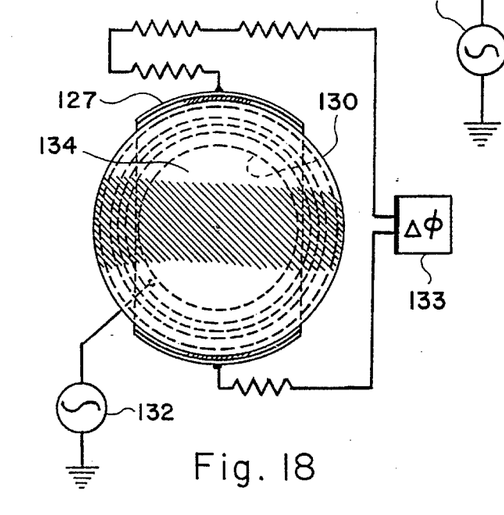
FIG. 18 illustrates another cross section of the pressure sensor shown in FIG. 17.

In FIG. 18, there is illustrated another cross section of the pressure sensor shown in FIG. 17, which cross section taken along plane 18—18 as shown in FIG. 17 shows the electrically conductive oblong or oval planar member 127 built into a planar structure 134 dividing the first pressure compartment into the two opposite halves thereof respectively located on the two opposite sides of the planar structure 134. In an alternative design, the electrically conductive oblong or oval planar member 127 without the planar structure 134 may be disposed completely or partially across the middle cross section of the first pressure compartment 130.

Figure 19:
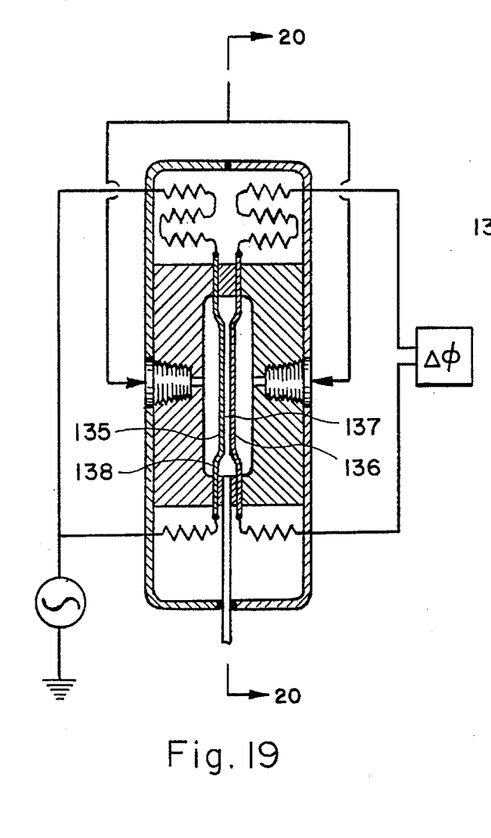
FIG. 19 illustrates a cross section of an embodiment of the pressure sensor equivalent to the embodiment shown in FIG. 14.

In FIG. 19, there is illustrated a cross section of an embodiment of the pressure sensor equivalent to the embodiment shown in FIG. 14. This particular illustrative embodiment results when the pair of electrically conductive elongated planar members 109 and 110 included in the pressure sensor shown in FIG. 14 are replaced by a pair of electrically conductive oblong or oval planar members 135 and 136 respectively playing the same roles as those of the elements 84 and 85 included in the interface distance sensor shown in FIG. 11. It should be noticed that each of the two electrically conductive oblong or oval planar members 135 and 136 has a central portion 137 offset with respect to the rim portion 138, which structural arrangement makes it possible to dispose the cupped central portions of the pair of electrically conductive oblong or oval planar members 135 and 136 in a close surface-to-surface proximity relationship. The electric circuits employed in the particular illustrative embodiment shown in FIG. 19 may be modified as described in conjunction with the design alternatives of the embodiment shown in FIG. 11.

Figure 20:
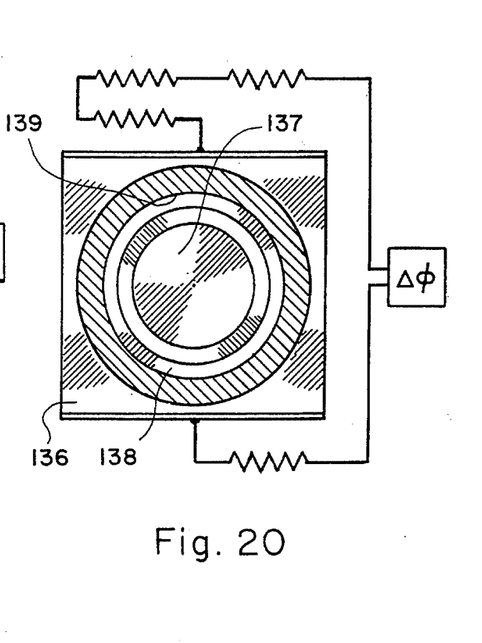
FIG. 20 illustrates another cross section of the pressure sensor shown in FIG. 19.

In FIG. 20, there is illustrated another cross section of the pressure sensor shown in FIG. 19, which cross section taken along plane 20—20 as shown in FIG. 19 shows the electrically conductive oblong or oval planar member 136, that has a square geometry instead of the oblong or oval geometry and has a cupped circular central portion disposed coaxially with respect to the circular cylindrical cavity 139 accommodating the first and second pressure compartments.

The structural embodiments comprising the two parallel and closely adjacent planar structures respectively defining the two interfaces in the distance sensor, and respectively defining the deflective and stationary end walls of the pressure compartment in the pressure sensor can be generically summarized as follows: In a first embodiment illustrated in FIGS. 1 through 5, 9, 12, 13, 15 and 16, the first planar structure comprises a first and second electrically conductive planar members disposed in a side-by-side coplanar relationship therebetween, and the second planar structure comprises a third electrically conductive planar member disposed in a superimposing relationship to the combination of the first and second electrically conductive planar members, wherein an alternating electrical signal generator supplies an input alternating electrical signal to the first electrically conductive planar member through a first elongated electrical conductor connected to the first electrically conductive planar member and a phase difference measuring device measures a phase angle difference between a first and second output alternating electrical signals respectively taken through a second and third elongated electrical conductors routed in one of the following three connections; a first connection wherein the second and third elongated electrical conductors are respectively connected to two opposite extremities of the second electrically conductive planar member, a second connection wherein the second elongated electrical conductor is connected to the second electrically conductive planar member and the third elongated electrical conductor is connected to the alternating electrical signal generator, and a third connection wherein the second elongated electrical conductor is connected to the second electrically conductive planar member and the third elongated electrical conductor is connected to the first electrically conductive planar member; wherein at least one of the first and second elongated electrical conductors includes an electric circuit element providing an ohmic resistance substantially limiting electric current flow through the at least one of the first and second elongated electrical conductors, and a data processor determines distance between the two interfaces or the pressure existing in the pressure compartment as a function of an electrical variable related to the phase angle difference between the first and second output alternating electrical signals. In a second embodiment illustrated in FIGS. 6, 7, 10, 17 and 18, the first and second planar structure respectively comprise a first and second electrically conductive planar members disposed in a superimposing relationship to one another, wherein an alternating electrical signal generator supplies an input alternating electrical signal to the first electrically conductive planar member through a first elongated electrical conductor connected to the first electrically conductive planar member and a phase difference measuring device measures a phase angle difference between a first and second output alternating electrical signals respectively taken through a second and third elongated electrical conductors routed in one of the following three connections; a first connection wherein the second and third elongated electrical conductors are respectively connected to two opposite extremities of the second electrically conductive planar members, a second connection wherein the second elongated electrical conductor is connected to the second electrically conductive planar member and the third elongated electrical conductor is connected to the alternating electrical signal generator, and a third connection wherein the second elongated electrical conductor is connected to the second electrically conductive planar member and the third elongated electrical conductor is connected to the first electrically conductive planar member; wherein at least one of the first and second elongated electrical conductors includes an electric circuit element providing an ohmic resistance substantially limiting electric current flow through the at least one of the first and second elongated electric conductors, and a data processor determines distance between the two interfaces or the pressure existing in the pressure compartment as a function of an electrical variable related to the phase angle difference between the first and second output alternating electrical signals. When a high degree of resolution in the measurement of the interface distance or of the pressure is required, it is important to dispose the two planar structures defined in the above-presented summary of the invention as close as possible to one another in a parallel relationship therebetween at the initial or neutral state, and both of the first and second elongated electrical conductors include resistors providing a very high ohmic resistance for each of the first and second elongated electrical conductors. In the construction of the pressure sensor, one or a plurality of minute protrusions extending from the surface of one of the first and second planar structures facing the other of the first and second planar structures should be included, whereby the first and second planar structures can be disposed very close to one another without allowing a full contact therebetween wherein the pressure cannot penetrate into the interfacial space between the first and second planar structures While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions, in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

We claim:

1. An apparatus for converting an interface distance between two reference surfaces to an electrical signal representing the interface distance, comprising in combination:

a) a first reference surface defined by a surface of at least one electrically conductive member, and a second reference surface defined by a surface of another electrically conductive member, said first and second reference surfaces disposed in a face-to-face relationship allowing a change in separation distance between the first and second reference surfaces, wherein the first reference surface comprises the surface of said one electrically conductive member in one of the following two relationship; the first reference surface comprises the surface of said one electrically conductive member, and the first reference surface comprises the surface of said one electrically conductive member and a surface of a third electrically conductive member having the surface thereof disposed in a coplanar side-by-side relationship with respect to the surface of said one electrically conductive member;

b) means for supplying an input alternating electrical signal to said another electrically conductive member through at least one electrical conductor disposed in one of the following two relationship; the electrical conductor is connected to said another electrically conductive member, and the electrical conductor is connected to said third electrically conductive member that transmits the input alternating electrical signal to said another electrically conductive member by capacitive electrical interaction between said third electrically conductive member and said another electrically conductive member; and c) means for obtaining an electrical variable related to a phase angle difference between two output alternating electrical signals respectively taken off through two electrical conductors disposed in one of the following three relationships; the two electrical conductors respectively extend from two different positions on said one electrically conductive member, the two electrical conductors respectively extend from said one electrically conductive member and said another electrically conductive member, and the two electrical conductors respectively extend from said one electrically conductive member and from the electrical conductor supplying the input alternating electrical signal to said another electrically conductive member.

2. An apparatus as defined in claim 1 including at least one circuit electric element providing an ohmic resistance substantially limiting flow of electric current through at least one of the two electrical conductors respectively providing the two output alternating electrical signals.

3. An apparatus as defined in claim 2 including means for determining the interface distance between the first and second reference surfaces as a function of the electrical variable related to the phase angle difference.

4. An apparatus as defined in claim 2 wherein at least one of the first and second reference surfaces deflects with a deflective planar member separating two pressure compartments from one another in a relationship wherein the interface distance between the first and second reference surfaces varies as a function of pressure difference between two pressures respectively contained in the two pressure compartments, and the apparatus includes means for determining the pressure difference as a function of the electrical variable related to the phase angle difference.

5. An apparatus as defined in claim 1 wherein the first reference surface comprises the surface of said one electrically conductive member only and the second reference surface comprises the surface of said another electrically conductive member disposed in a relationship wherein the surfaces of said one and said another electrically conductive members are disposed in a superimposing relationship.

6. An apparatus as defined in claim 5 wherein the two electrical conductors respectively providing the two output alternating electrical signals respectively extend from two opposite ends of said one electrically conductive member, and at least one of said two electrical conductors includes an electric circuit element providing an ohmic resistance substantially limiting flow of electric current through said at least one of said two electrical conductors.

7. An apparatus as defined in claim 6 including means for determining the interface distance between the first and second reference surfaces as a function of the electrical variable related to the phase angle difference.

8. An apparatus as defined in claim 5 wherein the two electrical conductors respectively providing the two output alternating electrical signals respectively extend from said one and said another electrically conductive members, and at least one of said two electrical conductors includes an electric circuit element providing an ohmic resistance substantially limiting flow of electric current through said at least one of said two electrical conductors.

9. An apparatus as defined in claim 8 including means for determining the interface distance between the first and second reference surfaces as a function of the electrical variable related to the phase angle difference.

10. An apparatus as defined in claim 5 wherein the two electrical conductors respectively providing the two output alternating electrical signals respectively extend from said one electrically conductive member and from the electrical conductor supplying the input alternating electrical signal to said another electrically conductive member, and at least one of said two electrical conductors includes an electric circuit element providing an ohmic resistance substantially limiting flow of electric current through said at least one of said two electrical conductors.

11. An apparatus as defined in claim 10 including means for determining the interface distance between the first and second reference surfaces as a function of the electrical variable related to the phase angle difference.

12. An apparatus as defined in claim 5 wherein at least one of the first and second reference surfaces deflects with a deflective planar member separating two pressure compartments from one another in a relationship wherein the interface distance between the first and second reference surfaces varies as a function of pressure difference between two pressures respectively contained in the two pressure compartments, and the apparatus includes means for determining the pressure difference as a function of the electrical variable related to the phase angle difference.

13. An apparatus as defined in claim 1 wherein the first reference surface comprises the surfaces of said one and said third electrically conductive members disposed on a common surface in a side-by-side relationship and the second reference surface comprises the surface of said another electrically conductive member disposed in a relationship wherein the surface of said another electrically conductive member and the combination of surfaces of said one and said third electrically conductive members are disposed in a superimposing relationship.

14. An apparatus as defined in claim 13 wherein the two electrical conductors respectively providing the two output alternating electrical signals respectively extend from two opposite ends of said one electrically conductive member, and at least one of said two electrical conductors includes an electric circuit element providing an ohmic resistance substantially limiting flow of electric current through said at least one of said two electrical conductors.

15. An apparatus as defined in claim 14 including means for determining the interface distance between the first and second reference surfaces as a function of the electrical variable related to the phase angle difference.

16. An apparatus as defined in claim 13 wherein the two electrical conductors respectively providing the two output alternating electrical signals respectively extend from said one electrically conductive member and from the electrical conductor supplying the input alternating electrical signal to said another electrically conductive member, and at least one of said two electrical conductors includes an electric circuit element providing an ohmic resistance substantially limiting flow of electric current through said at least one of said two electrical conductors.

17. An apparatus as defined in claim 16 including means for determining the interface distance between the first and second reference surfaces as a function of the electrical variable related to the phase angle difference.

18. An apparatus as defined in claim 13 wherein the two electrical conductors respectively providing the two output alternating electrical signals respectively extend from two opposite ends of said one electrically conductive member, and the electrical conductor supplying the input alternating electrical signal connected to said third electrically conductive member is connected to two opposite ends of said third electrically conductive member, and at least one of said two electrical conductors includes an electric circuit element providing an ohmic resistance substantially limiting flow of electric current through said at least one of said two electric conductors.

19. An apparatus as defined in claim 18 including means for determining the interface distance between the first and second reference surfaces as a function of the electrical variable related to the phase angle difference.

20. An apparatus as defined in claim 13 wherein at least one of the first and second reference surfaces deflects with a deflective planar member separating two pressure compartments from one another in a relationship wherein the interface distance between the first and second reference surfaces varies as a function of pressure difference between two pressures respectively contained in the two pressure compartments, and the apparatus includes means for determining the pressure difference as a function of the electrical variable related to the phase angle difference.

\* \* \* \* \*